(12) United States Patent
Carlsson

(10) Patent No.: US 8,419,826 B2
(45) Date of Patent: Apr. 16, 2013

(54) PROCESS FOR REGENERATION OF ADSORBENT BEDS

(75) Inventor: Anders Carlsson, Amsterdam (NL)

(73) Assignee: Shell Oil Company, Houston, TX (US)

( * ) Notice: Subject to any disclaimer, the term of this patent is extended or adjusted under 35 U.S.C. 154(b) by 261 days.

(21) Appl. No.: 12/865,790

(22) PCT Filed: Feb. 2, 2009

(86) PCT No.: PCT/EP2009/051119
§ 371 (c)(1),
(2), (4) Date: Oct. 7, 2010

(87) PCT Pub. No.: WO2009/098173
PCT Pub. Date: Aug. 13, 2009

(65) Prior Publication Data
US 2011/0017061 A1 Jan. 27, 2011

(30) Foreign Application Priority Data

Feb. 4, 2008 (EP) .................... 08101234

(51) Int. Cl.
B01D 53/04 (2006.01)
B01J 20/34 (2006.01)
(52) U.S. Cl.
USPC ........ 95/18; 95/115; 95/123; 95/125; 95/135; 95/148

(58) Field of Classification Search .................. 95/1, 14, 95/18, 114, 115, 117, 121–123, 135–137, 95/148, 125; 502/34
See application file for complete search history.

(56) References Cited

U.S. PATENT DOCUMENTS

| 4,153,428 A * | 5/1979 | Saunders et al. .................. 95/99 |
| 4,865,826 A * | 9/1989 | Carnell et al. ................ 423/230 |
| 7,000,332 B1 * | 2/2006 | Fresch et al. .................... 34/330 |
| 2005/0150377 A1 | 7/2005 | Friday et al. ...................... 95/96 |

FOREIGN PATENT DOCUMENTS

| EP | 329301 | 8/1989 |
| FR | 2856607 | 12/2004 |
| WO | WO9613326 | 5/1996 |
| WO | WO2004039926 | 5/2004 |

* cited by examiner

Primary Examiner — Frank Lawrence, Jr.
(74) Attorney, Agent, or Firm — Charles W. Stewart

(57) ABSTRACT

The invention provides a process for the regeneration of at least one adsorbent bed, comprising at least the steps of: (a) contacting a first adsorbent bed (B1) with a gaseous stream (10) such that at least a portion of adsorbed species in said first adsorbent bed (B1) are released; (b) cooling a second adsorbent bed (B2); wherein a bypass (20) is provided around the second adsorbent bed (B2) and the gaseous stream (10), before contact with the first adsorbent bed (B1), is directed to at least one of (i) the second adsorbent bed (B2), and (ii) the bypass (20) around the second adsorbent bed (B2), wherein the proportion of gaseous stream (10) flowing through the bypass (20) is controlled.

20 Claims, 1 Drawing Sheet

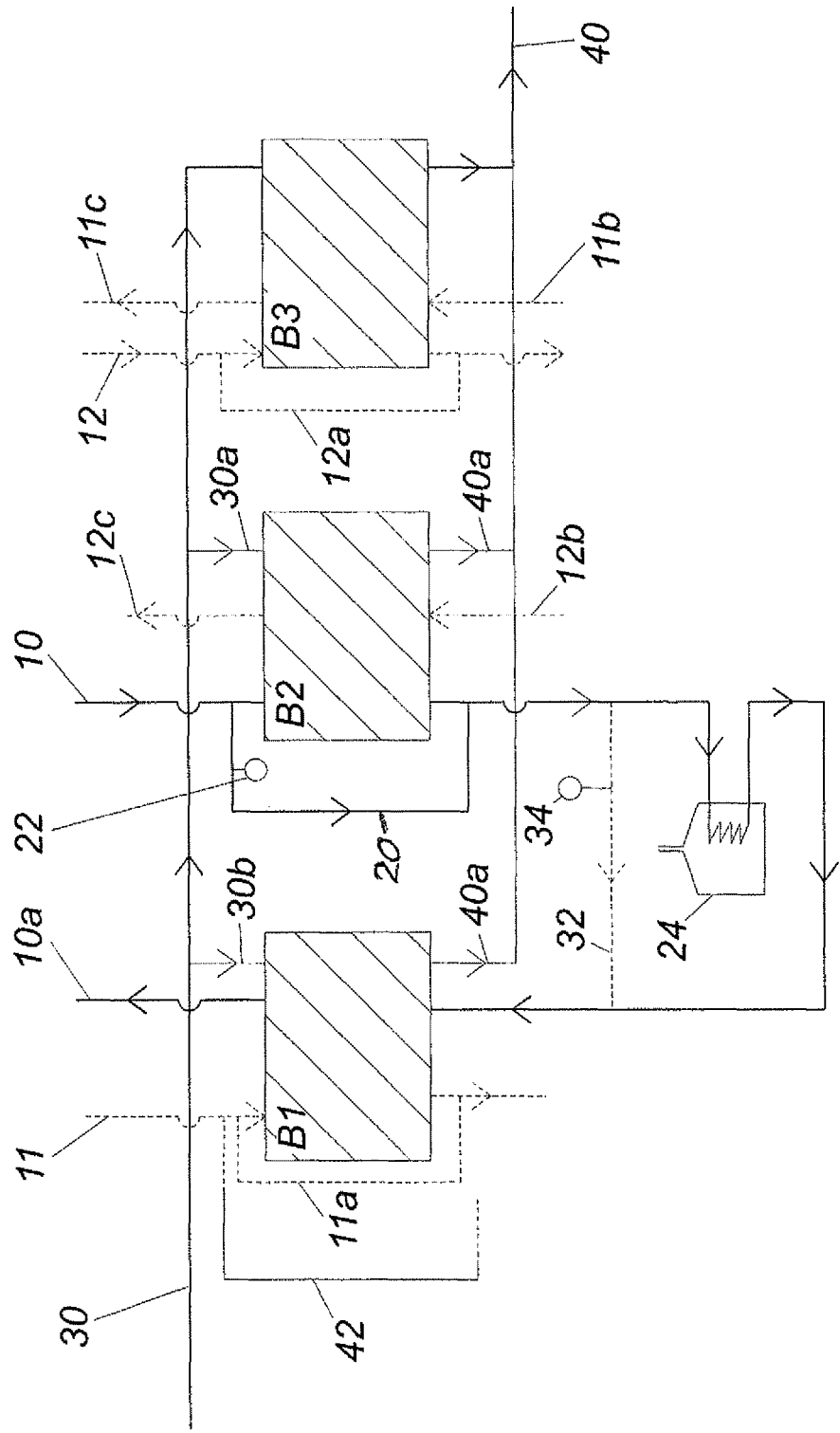

PROCESS FOR REGENERATION OF ADSORBENT BEDS

The present application claims priority from European Patent Application 08101234.6 filed 4 Feb. 2008.

The present invention relates to a process for the regeneration of adsorbent beds, especially a continuous process comprising removal of a particular species from a gaseous stream and subsequent regeneration of the adsorbent beds, particularly by temperature swing adsorption.

Adsorbent beds may be used for a variety of separation processes, for example, to dry a gaseous stream, to remove mercury from a produced gas stream or to remove sulphur compounds from a hydrocarbonaceous stream comprising said sulphur compounds.

The removal of sulphur-containing compounds from hydrocarbonaceous streams comprising such compounds has always been of considerable importance in the past and is even more so today in view of continuously tightening process requirements and environmental regulations. This holds not only for natural gas streams to be used for e.g. the preparation of synthesis gas or for residential use or to be transported as liquefied natural gas, but also for natural gas liquid streams, natural gas condensate streams as well as for crude oil derived refinery streams containing sulphur compounds.

Sulphur contaminants in hydrocarbon streams include hydrogen sulphide, carbonyl sulphide, mercaptans, sulphides, disulphides, thiophenes and aromatic mercaptans, which due to their odorous nature can be detected at parts per million concentration levels. Thus, it is desirable for users of such natural gas and refinery streams to have concentrations of total sulphur compounds lowered to e.g. less than 20 or 30 ppmv or less than 50-75 mgS/Nm$^3$, the amount of non-hydrogen sulphide compounds lowered to e.g. less than 5, or even less than 2 ppmv or less than 12 mgS/Nm$^3$ or even less than 5 mgS/Nm$^3$.

Numerous natural gas wells produce what is called "sour gas", i.e. natural gas containing hydrogen sulphide, mercaptans, sulphides and disulphides in concentrations that makes the natural gas unsuitable for direct use. Considerable effort has been spent to find effective and cost-efficient means to remove these undesired compounds. In addition, the natural gas may also contain varying amounts of carbon dioxide, which depending on the use of the natural gas often has to be removed at least partly.

Regenerable solid bed adsorption processes are very suitable for the removal of sulphur compounds such as methyl mercaptan, ethyl mercaptan, normal and isopropyl mercaptan and butyl mercaptan. However, the regeneration of the adsorption beds is often a considerable problem. Ageing of the adsorbents causes a gradual decrease in adsorption capacity. Several types of ageing exist: thermal cycling, hydrothermal ageing, and contamination, often caused by co-adsorption of species and coke formation on the surface of the adsorbent.

Adsorbent beds may also be used for removing water from a gaseous stream, such as a hydrocarbonaceous stream, prior to its further treatment, such as cooling and/or liquefying. Water may be present in a gaseous stream as a constituent from its source, or may become part of the gaseous stream due to one or more other treatments such as removal of one or more other constituents in the gaseous stream as mentioned hereinbefore. Natural gas may contain one or more sulphur compounds, as well as varying amounts of carbon dioxide, and such compounds, which together can form 'acid gas', can be removed from a gaseous stream by the use of one or more amines, commonly in an 'acid gas recovery unit' (AGRU).

However, as a result, the treated gaseous stream now has a relatively higher water content, which must be reduced and/or removed before cooling and/or liquefying the gaseous stream. Regenerable adsorbent beds are suitable for the removal of water from a gaseous stream.

However, the regeneration of an adsorbent bed by the passage of a hot and dry regeneration gas at an initially high temperature therethrough leads to cake-formation of the adsorbent bed material, because the first part of the adsorbent bed is heated too fast compared to the later or furthest part of the adsorbent bed, which is still relatively cool. This can condense out the compound or compounds being desorbed, forming undesired condensation and liquid in the adsorbent bed, leading to deactivation of the adsorbent. Avoiding caking requires a carefully controlled temperature profile over time during regeneration.

Furthermore, regeneration at initially high temperatures of an adsorbent bed previously loaded with sulphur-compounds leads to coke-formation on the adsorbent material. Coke formation occurs because the sulphur-compounds have insufficient time to diffuse out of the pores of the adsorbent before a temperature is reached where they decompose and cause deactivation of the adsorbent. Avoiding coking requires a carefully controlled temperature profile over time during regeneration.

The present invention provides a process for the regeneration of at least one adsorbent bed, comprising at least the steps of:

(a) contacting a first adsorbent bed (B1) with a gaseous stream (10) such that at least a portion of adsorbed species in said first adsorbent bed (B1) are released;
(b) cooling a second adsorbent bed (B2);
wherein a bypass (20) is provided around the second adsorbent bed (B2) and the gaseous stream (10), before contact with the first adsorbent bed (B1), is directed to at least one of (i) the second adsorbent bed (B2), and (ii) the bypass (20) around the second adsorbent bed (B2), wherein the proportion of gaseous stream (10) flowing through the bypass (20) is controlled.

Embodiments and examples of the present invention will now be described by way of example only with reference to the accompanying non-limited drawing in which:

FIG. 1 is a diagrammatic scheme for a process for the regeneration of at least one adsorbent bed according to one embodiment of the present invention.

For the purpose of this description, a single reference number be assigned to a line, as well as a stream carried in that line.

The present invention provides a process for the regeneration of at least one adsorbent bed by a gaseous stream, which is directed to at least another adsorbent bed and a by-pass, so that there is better control of the temperature of the gaseous stream prior to it contacting the adsorbent bed.

FIG. 1 shows a process for the regeneration of a first adsorbent bed B1 with a gaseous stream 10 according to one embodiment of the present invention.

The gaseous stream 10 may be any suitable hydrocarbon stream, non-hydrocarbon stream, or mixture thereof able to assist with the desorption of the adsorbed species in the first adsorbent bed B1 as part of the regeneration. Suitable gaseous streams include natural gas, optionally treated.

The first adsorbent bed B1 may comprise one or more adsorbent beds, parts, areas, units, portions or stages, being in series, parallel or both. The present invention is not limited by the type or arrangement of the first adsorbent bed, or by the nature of the species, such as water or sulphur compounds, that can be adsorbed by the first adsorption bed.

The first adsorption bed B1 may comprise one or more adsorbents. One example comprises a zeolite dispersed in a binder, preferably a molecular sieve known in the art.

The adsorption of a species such as sulphur compounds or water by an adsorbent bed is known in the art. Such species can be constituents of a contaminated gaseous stream 30, which passes through an 'active' mode adsorbent bed such as the third adsorbent bed B3 shown in FIG. 1. Such adsorption leads to a reduced-contaminant gaseous stream 40 which can then be passed for further treatment, including cooling and/or liquefaction such as to provide liquefied natural gas (LNG). Further discussion of suitable removal of sulphur compounds from hydrocarbons streams using absorbents is mentioned in our WO 2004/039926 A1.

Over time, the adsorbent in the third adsorbent bed B3 will become loaded or saturated, such that the third adsorbent bed B3 will need regeneration.

Regeneration of an adsorbent bed is a process known in the art. Further discussion of the regeneration of loaded absorbents, including suitable operating parameters, is also mentioned in our WO 2004/039926 A1.

One regeneration process involves temperature-swing adsorption (TSA), in which a high-temperature gaseous stream is passed through the adsorbent bed once it is taken off-line from an active or adsorbent mode receiving a contaminated gaseous stream 30. The higher temperature during regeneration causes adsorbed species such as water to desorb from the adsorbent, and be carried with the gaseous stream out of the adsorbent bed as a post-desorption gaseous stream 10a. Treatment of a post-desorption gaseous stream 10a is known in the art and not further discussed herein.

FIG. 1 shows a first adsorbent bed B1 intended to be regenerated according to an embodiment of the present invention. Hence, the first adsorbent bed B1 is shown in a "heating" mode. It is being heated as the higher temperature gaseous stream 10 passes therethrough in order to release at least a portion of adsorbed species in the first adsorbent bed B1.

The general operating parameters, such as pressure, flow rate, etc, for regenerating an absorbent bed are known in the art. The present invention may also comprise changing the pressure of one or more of the streams described herein to assist one or more of the processes described herein. The present invention may also involve one or more additional coolers, such as water and/or air coolers, to alter the temperature of a stream. The location and/or use of one or more additional coolers is known to the skilled person, and is not further described herein.

After an adsorbent bed has been regenerated, it has a high temperature (due to the passage of the higher temperature gaseous stream 10 therethrough), such that following regeneration, the adsorbent bed requires a 'cooling' mode or period prior to reverting to the active or adsorption mode. FIG. 1 shows a second adsorbent bed B2 in a cooling mode prior to reintroduction of a contaminated gaseous stream 30.

Typically, two or more adsorbent beds are aligned in a unit or apparatus to treat a contaminated gaseous stream 30. FIG. 1 shows first, second and third adsorbent beds B1, B2 and B3 which may be in one or more discrete locations, or preferably aligned within a single adsorption unit 42. The adsorption unit 42 may be a 'dehydration unit' where the adsorbed species is water. The adsorption unit 42 may be a 'desulphurisation unit' where the adsorbed species is one or more sulphur compounds. The adsorption unit 42 may be a combination unit able to adsorb more than one species, such as water and sulphur compounds.

Where a single unit comprises at least two, preferably at least three adsorbent beds, a 'continuous' process for the treatment of a contaminated gaseous stream 30 can be carried out, based on simultaneously, at least one adsorbent bed being 'active' to treat the contaminated gaseous stream 30, at least one adsorbent bed being in a heating mode, and at least one adsorbent bed being a cooling mode.

In practice, single adsorption units comprise a plurality of adsorbent beds to allow for the continuous treatment of a contaminated gaseous stream 30 which can involve a number of adsorbent beds being off-line for heating and/or cooling. Multiple beds can be rotated in and out of the various modes of adsorption, heating and cooling.

FIG. 1 shows a continuous process such that the first adsorbent bed B1, following step (a) contact with the gaseous stream 10 to desorb at least a portion of said species, is then step (b) cooled, and then step (c) operated to adsorb at least a portion of a contaminated gaseous stream 30 before returning again to step (a) contact with the gaseous stream 10 to desorb at least a portion of said species. Meanwhile, the second adsorbent bed B2, after step (b) cooling, is operated to undergo said step (c) and then step (a) and then step (b). Further meanwhile, the third adsorbent bed B3, after step (c), is operated to undergo said step (a) then step (b) then step (c).

In this way, one of each said adsorbent bed B1, B2, B3 is continually at each of said three steps (a), (b) and (c).

In the arrangement shown in FIG. 1, the contaminated gas stream 30 is shown in bold line passing into the third adsorbent bed B3 in active mode. Switching the passage of the contaminated gaseous stream 30 into either of the first adsorbent bed B1 (after its regeneration and cooling), and/or through the second adsorbent bed B2 (after completion of its cooling) can be carried out by using the feed lines 30a in a manner known in the art.

From the third adsorbent bed B3 is provided a reduced-contaminant gaseous stream 40, shown in FIG. 1 in bold line. Similarly, passage of a reduced-contaminant gaseous stream 40 from one or both of the first and second adsorbent beds B1 and B2 can be carried out via lines 40a when required.

Once an adsorbent bed is regenerated, it is changed to a cooling mode prior to adsorption as described above. Typically, cooling is assisted by the passage of the gaseous stream 10 therethrough, in order to cool the adsorbent bed as well as heat the gaseous stream 10 and therefore reduce the additional heating of the gaseous stream 10 required for it to be hot enough for the subsequent regeneration process.

FIG. 1 shows the gaseous stream 10 passing through the cooling second adsorbent bed B2 prior to passage through a heater 24 such as a boiler, and then contacting the first adsorbent bed B1 as described above.

It is desired to be able to finely control the temperature regime, including ramp rate and distribution, in all parts of an adsorbent bed undergoing regeneration in order correctly regenerate all of the absorbent bed and avoid the problems mentioned hereinbefore (caking or coking). However, the heat adsorbed by the gaseous stream 10 by passage through the second adsorbent bed B2 cannot be controlled, as the heat adsorption is a simple heat exchange between the second adsorbent bed B2 and the regular flow of the gaseous stream 10 as required by the first adsorbent bed B1. The cooling second adsorbent bed B2 is not a controllable heat exchanger.

Similarly, subtle heating variation by known heaters 24 such as boilers, is also not possible at the required temperatures and flow rates of a gaseous stream. Thus, fine control of the temperature of the gaseous stream 10 prior to its passage into the first adsorbent bed B1 has hitherto not been possible. As a consequence, the first part of the first adsorbent bed B1 in contact with the gaseous stream 10 is usually heated more quickly than the further or later parts of the first adsorbent bed B1. This leads to a temperature differential across the first adsorbent bed B1, which can cause uneven desorption and/or uneven carriage of the species desired to be carried out of the first adsorbent bed B1 as part of the regeneration process.

Uneven desorption and/or carriage can then lead to uneven heating and/or condensation and/or coking of a species in the first adsorbent bed B1. For example, where the species is water, the condensation of liquid water can cause clay binder in a molecular sieve to dissolve, subsequently forming a solid cake during regeneration. Solid cake cannot subsequently then adsorb species during a subsequent active mode, and/or can lead to the formation of larger solid cakes causing flow disruption and/or unevenness of a contaminated gaseous stream therethrough. Furthermore, where the species is a sulphur compound such as methyl mercaptan, ethyl mercaptan, or propyl mercaptan, a fast heating rate can cause decomposition of the sulphur species on the adsorbent. Decomposition of sulphur species blocks pores in the adsorbent, impairing the ability of the adsorbent to remove species from the process stream during subsequent adsorption cycles. All of the above problems reduce the effectiveness of a regenerated adsorbent bed, especially on a large industrial scale. Continuing regeneration can lead to exasperating such problems.

The present invention provides a bypass 20 around the second adsorbent bed B2. Passage of the gaseous stream 10 or a fraction thereof through the bypass 20 can be controlled by a control system 22. The control system 22 may be located at any suitable location, at least a portion of which is associated with the bypass 20 as shown in FIG. 1.

The proportion of the gaseous stream 10 directed to (i) the second adsorbent bed B2, and (ii) the bypass 20, is continuously variable, from the entire gaseous stream 10 flowing to (i) the second adsorbent bed B2, to, the entire gaseous stream 20 flowing to (ii) the bypass 20; and any proportion therebetween.

Preferably, the control system 22 can automatically vary the proportion of the gaseous stream flowing to at least one of (i) the second adsorbent bed B2 and (ii) the bypass 20, depending on, at least in part, the temperature detected in the first adsorbent bed B1 at one or more locations therein and/or at one or more inlets and outlets, compared to the temperature(s) sought in the first adsorbent bed B1 at the same locations.

By controlling the proportion of the gaseous stream 10 flowing through the bypass 20 and/or second adsorbent bed B2, the present invention is able to better control the temperature of the gaseous stream 10 downstream of the second adsorbent bed B2.

When it is the turn of the third adsorbent bed B3 to be regenerated, passage of the contaminated gaseous stream 30 can be switched via line 30a into the second adsorbent bed B2, and passage of the gaseous stream 10 can be switched to line 11 to pass through the first adsorbent bed B1 now in cooling mode. FIG. 1 shows a bypass 11a around the first adsorbent bed B1 for the process of the present invention. The gaseous stream 10 can then contact the third adsorbent bed B3 through line 11b to provide a post-desorption gaseous stream 11c.

Similarly, when it is the turn of the second adsorbent bed B2 to be regenerated, passage of the contaminated gaseous stream 30 can be switched via line 30b into the first adsorbent bed B1, and passage of the gaseous stream 10 can be switched to line 12 to pass through the third adsorbent bed B3 now in cooling mode. FIG. 1 shows a bypass 12a around the third adsorbent bed B3 for the process of the present invention. The gaseous stream 10 can then contact the second adsorbent bed B2 through line 12b to provide a post-desorption gaseous stream 12c.

Preferably, the process of the present invention comprises a heater 24 operable to further heat the gaseous stream 10 downstream of the cooling adsorbent bed and its bypass. FIG. 1 shows a heater 24 downstream of the second adsorbent bed B2 and its bypass 20.

Optionally, the present invention further includes a bypass 32 around the heater 24. In this way, the gaseous stream 10 can be directed to at least one of (i) the heater 24, and (ii) the bypass 32 around the heater 24. Preferably, the proportion of the gaseous stream 10 directed to (i) the heater 24, and (ii) the bypass 32 around the heater 24, is continuously variable, from the entire gaseous stream 10 flowing to (i) the heater 24, to, the entire gaseous stream flowing to (ii) the bypass 32 around the heater 24; and any proportion therebetween.

More preferably, a control system 34 is provided to automatically vary the proportion of gaseous stream 10 flowing to (i) the heater 24 and (ii) the bypass 32 around the heater 24, depending on, at least in part, the temperature(s) detected in the first adsorbent bed B1 compared to the temperature(s) sought therein.

In this way, the temperature of the gaseous stream 10 contacting the first adsorbent bed B1 can be controlled, at least in part, by the relative proportion of the gaseous stream 10 directed to (i) the heater 24, and (ii) the bypass 32 around the heater 24.

The present invention provides a process wherein the temperature of a gaseous stream contacting an adsorbent bed, such the first adsorbent bed B1 undergoing regeneration, can be better controlled by the use of the passage of at least a portion, part or fraction of the gaseous stream through a bypass around an adsorbent bed undergoing cooling, such as the second adsorbent bed B2 shown in FIG. 1.

The passage of the gaseous stream 10 in FIG. 1 is shown in bold. By varying the proportion of the gaseous stream 10 passing through the bypass 20 in FIG. 1, it is possible to better control the temperature of the gaseous stream 10 contacting the first adsorbent bed B1.

In one example, it may be desired to gradually increase the temperature of the gaseous stream 10 contacting the first adsorbent bed B1, and this may be achieved by relating a gradual increase in the proportion of the gaseous stream 10 directed through the second adsorbent bed B2, and corresponding decrease through the bypass 20 around the second adsorbent bed B2.

The present invention provides the ability to change the temperature in an adsorbent bed undergoing regeneration with a constant or regular or even rate of change, to avoid in particular any period and/or location during the heating of the adsorbent bed where the temperature increase is static or otherwise not increasing, and in particular where the dewpoint of the species being dissolved is greater than the temperature of the gaseous stream at one or more locations in the adsorbent bed.

The person skilled in the art will understand that the present invention can be carried out in many various ways without departing from the scope of the appended claims.

What is claimed is:

1. A process for the regeneration of an adsorbent bed, wherein the process comprises the steps of:
   (a) providing a first adsorbent bed (B1), having an adsorbed species, a second adsorbent bed (B2), and a bypass around said second adsorbent bed (B2);
   (b) directing a proportion of a gaseous stream through said bypass to said first adsorbent bed (B1), and contacting said first adsorbent bed (B1) with said proportion of said gaseous stream such that at least a portion of said adsorbed species in said first adsorbent bed (B1) are released;

(c) cooling said second adsorbent bed (B2) with a remaining proportion of said gaseous stream by directing said remaining proportion of said gaseous stream to flow through said second adsorbent bed (B2); and, (d) controlling said proportion of said gaseous stream directed to flow through said bypass.

2. A process as claimed in claim 1, wherein said remaining proportion of said gaseous stream directed to said second adsorbent bed (B2) and said proportion of said gaseous stream directed to said bypass are continuously variable.

3. A process as claimed in claim 2, wherein a control system is provided to automatically vary said proportion of said gaseous stream flowing to said bypass, depending on, at least in part, a temperature detected in said first adsorbent bed compared to a temperature sought.

4. A process as claimed in claim 3, wherein said temperature detected in said first adsorbent bed (B1) during step (b) is controlled, at least in part, by said proportion of said gaseous stream directed to said bypass.

5. A process as claimed in claim 4, wherein said temperature of said first adsorbent bed (B1) is gradually increased.

6. A process as claimed in claim 5, wherein said remaining proportion of said gaseous stream directed through said second adsorbent bed (B2) is gradually increased.

7. A process as claimed in claim 6, wherein a third adsorbent bed (B3) is used, the process further comprising the step of (e) operating said third adsorbent bed (B3) to adsorb at least a portion of a contaminant from a contaminated gaseous stream.

8. A process step as claimed in claim 7, wherein step (e) comprises either adsorbing a sulphur containing compound from a gaseous hydrocarbonaceous contaminated gas stream, comprising said sulphur containing compound, or adsorbing water from a gaseous hydrocarbonaceous contaminated gas stream, comprising water.

9. A process as claimed in claim 8, wherein the process is a continuous process such that said first adsorbent bed (B1) following step (b) contact with a gaseous stream to desorb at least a portion of said species, is then step (c) cooled, and then step (e) operated to adsorb at least a portion of a contaminated gaseous stream before step (b) contact with said gaseous stream to desorb at least a portion of said species;

said second adsorbent bed (B2), after step (c) cooling, is operated to undergo said step (e) then step (b) and then step (c);

said third adsorbent bed (B3), after step (e), is operated to undergo said step (c) then step (c) then step (e);

such that one of each said adsorbent bed (B1, B2, B3) is continually at each of said three steps (b), (c) and (e).

10. A process as claimed in claim 9, wherein upstream of said first adsorbent bed (B1), a heater is provided operable to heat said gaseous stream.

11. A process as claimed in claim 10, wherein a bypass is provided around said heater and thus said proportion of said gaseous stream, before contact with said first adsorbent bed (B1), is directed to at least one of said heater and said bypass around said heater, wherein a control system is provided to automatically vary the direction of said gaseous stream flowing to said heater and said bypass around said heater, depending on, at least in part, said temperature detected in said first adsorbent bed (B1) compared to said temperature sought.

12. A regeneration process that includes the regeneration of a first adsorbent bed and the cooling of a second adsorbent bed, wherein the process comprises the steps of:

(a) directing a proportion of a gaseous stream to pass through said second adsorbent bed, thereby cooling said second adsorbent bed;

(b) controlling a remaining proportion of said gaseous stream so that it flows through a bypass around said second adsorbent bed and to said first adsorbent bed; and, (c) contacting said first adsorbent bed with said remaining proportion of said gaseous stream flowing through said bypass.

13. A process as claimed in claim 12, wherein step (b) is performed continuously to vary said proportion of said gaseous stream flowing through said bypass.

14. A process as claimed in claim 13, wherein step (b) is performed by a control system, wherein said control system controls said remaining proportion of said gaseous stream directed to said bypass in reference to a difference between a temperature in said first adsorbent bed and a sought temperature.

15. A process as claimed in claim 14, wherein said remaining proportion of said gaseous stream is heated by a heater before contacting it with said first adsorbent bed.

16. A process as claimed in claim 15, wherein provided is a heater bypass around said heater and a heater control system to direct a portion of said remaining proportion of said gaseous stream to flow through said heater bypass around said heater.

17. A process as claimed in claim 12, wherein the process further comprises the step of (d) operating a third adsorbent bed to adsorb a contaminant from a contaminated gaseous stream comprising said contaminant that is either sulphur or water, or both.

18. A process as claimed in claim 17, wherein, on a continuous basis, said first adsorbent bed, following contact with said gaseous stream to desorb said contaminant in a heating mode, is secondly cooled in a cooling mode, then thirdly adsorbs a further contaminant of said contaminated gaseous stream in an active mode, and fourthly returns to said heating mode to be contacted by said remaining proportion of said gaseous stream, thereby desorbing said further contaminant of said contaminated gaseous stream.

19. A process as claimed in claim 18, wherein step (a) comprises a cooling mode, step (c) comprises a heating mode, step (d) comprises an active mode, and said first adsorbent bed, after contacting said gaseous stream to desorb said contaminant from said gaseous stream, is cooled in said cooling mode, then adsorbs a further contaminant from said gaseous stream in said active mode, and returns to said heating mode to thereby desorb said further contaminant.

20. The process as claimed in claim 19, wherein said first adsorbent bed, said second adsorbent bed, and said third adsorbent bed are continually at each of said heating mode, said cooling mode, and said active mode.

* * * * *